T. Y. OLSEN.
DUCTILITY TESTING MACHINE.
APPLICATION FILED APR. 6, 1917.

1,371,050.

Patented Mar. 8, 1921.
6 SHEETS—SHEET 1.

Inventor—
Thorsten Y. Olsen,
by his Attorneys—
Howson & Howson

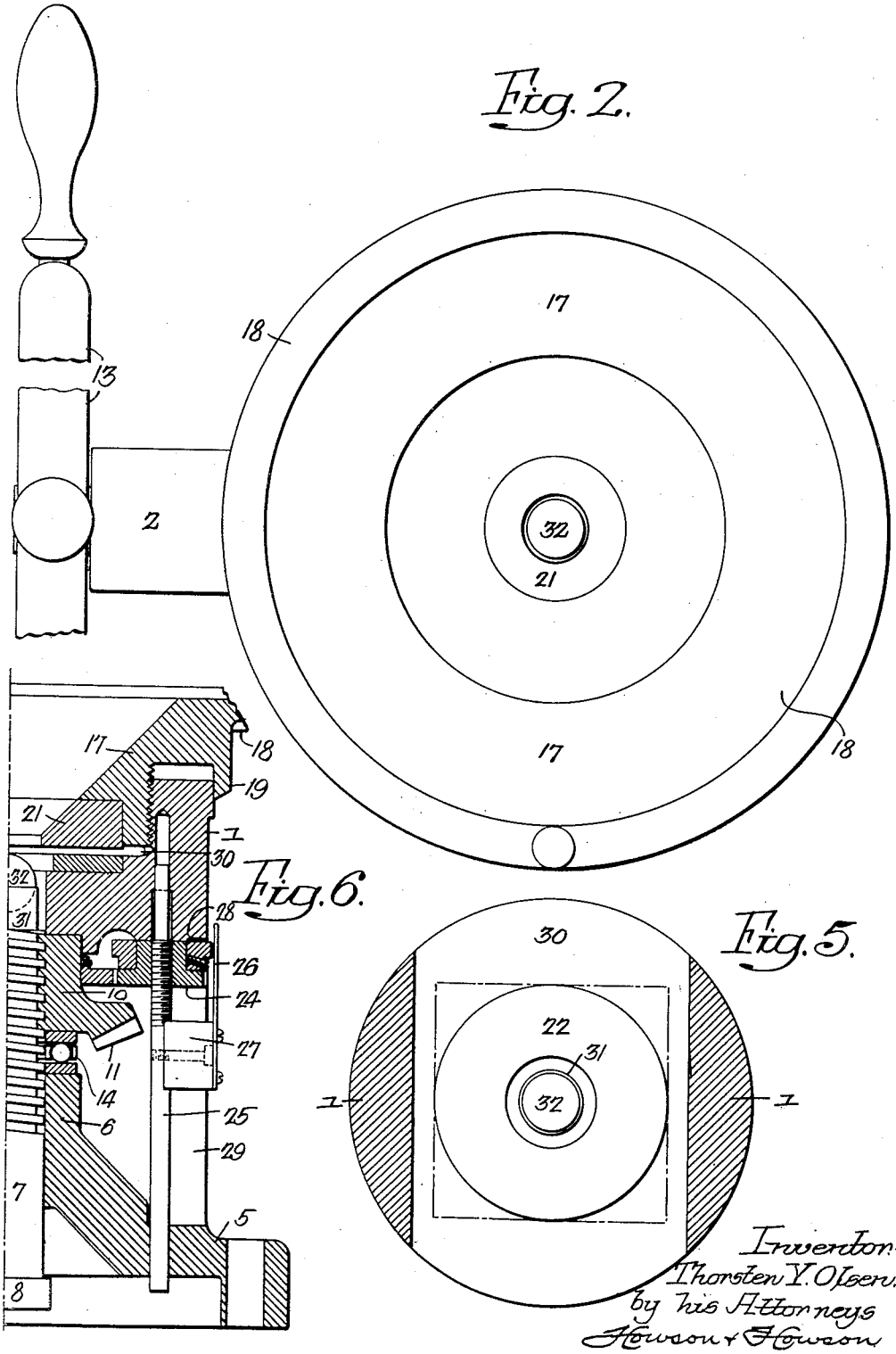

T. Y. OLSEN.
DUCTILITY TESTING MACHINE.
APPLICATION FILED APR. 6, 1917.

1,371,050.

Patented Mar. 8, 1921.

Inventor—
Thorsten Y. Olsen.
by his Attorneys,
Howson & Howson

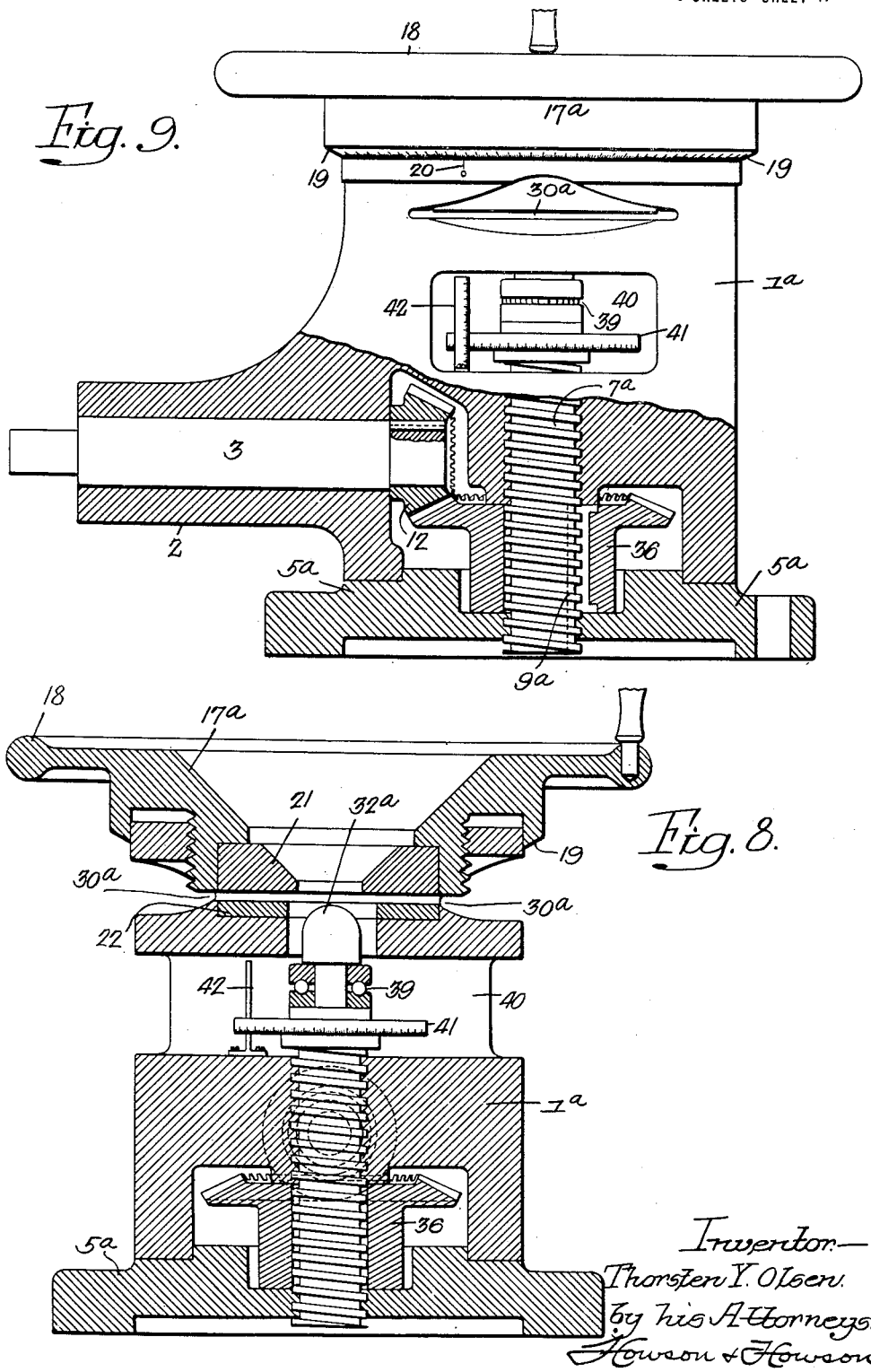

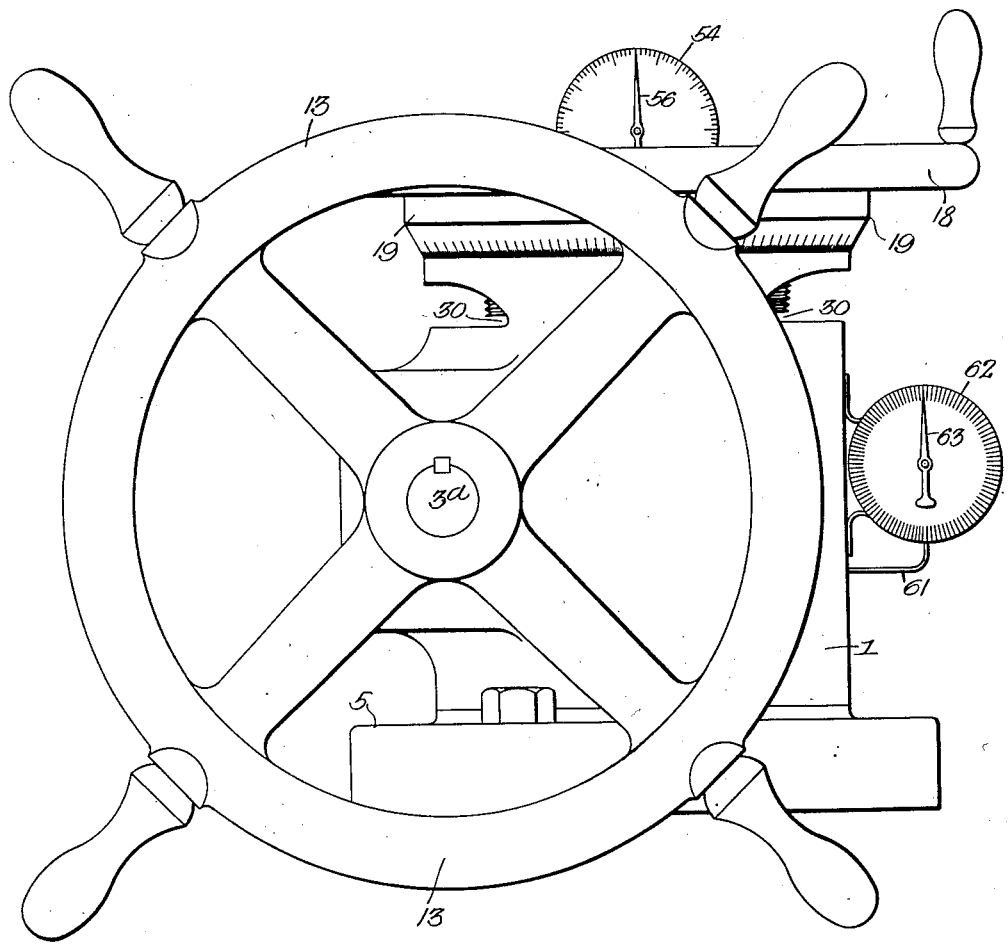

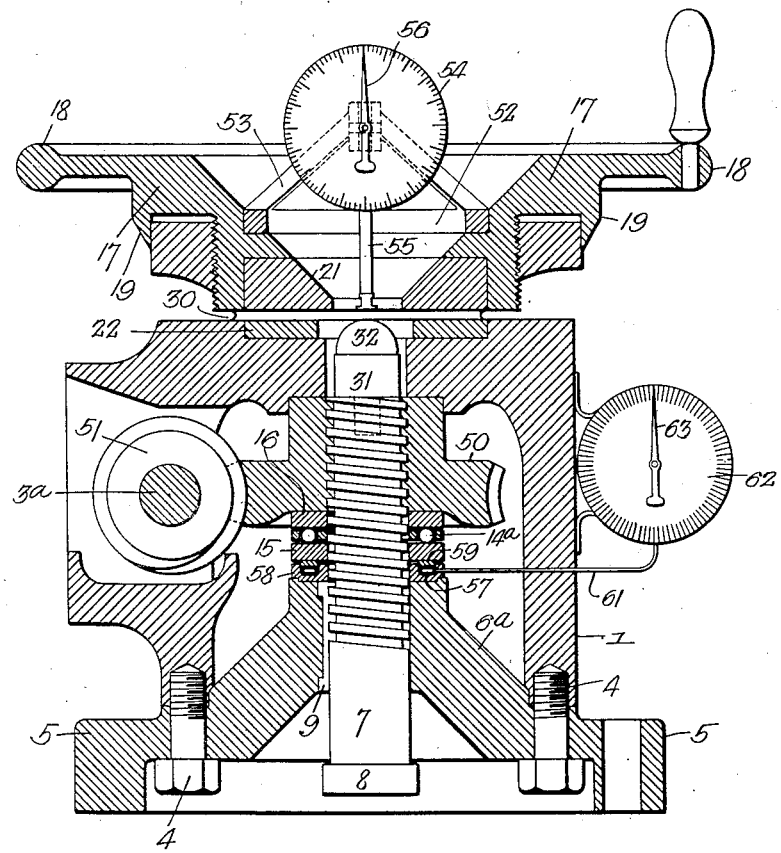

UNITED STATES PATENT OFFICE.

THORSTEN Y. OLSEN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

DUCTILITY-TESTING MACHINE.

1,371,050.     Specification of Letters Patent.     Patented Mar. 8, 1921.

Application filed April 6, 1917. Serial No. 160,140.

*To all whom it may concern:*

Be it known that I, THORSTEN Y. OLSEN, a citizen of the United States, residing in Philadelphia, Pennsylvania, have invented Ductility-Testing Machines, of which the following is a specification.

One object of this invention is to provide a substantial and conveniently operated machine for determining the workability of or the drawing, stamping and certain other qualities of metal sheets;—the invention more particularly having to do with novel means for holding and applying stress to a sheet under examination in order to test its ductility.

A further object of my invention is to provide a machine of the above type with novel and relatively simple means for indicating or determining the amount of deformation of a sheet tested to determine its ductility.

These objects and other advantageous ends I secure as hereinafter set forth, reference being had to the accompanying drawings, in which, Figures 1 and 2 are respectively a side elevation and a plan of a testing machine constructed according to my invention;

Fig. 3 is a vertical section taken in a plane passing through the hand wheel spindle;

Figs. 4 and 5 are horizontal sections on the lines 4—4 and 5—5, Fig. 3;

Fig. 6 is a vertical section on the line 6—6, Fig. 4;

Fig. 8 is a central vertical section of a slightly modified form of my testing machine;

Figure 1:
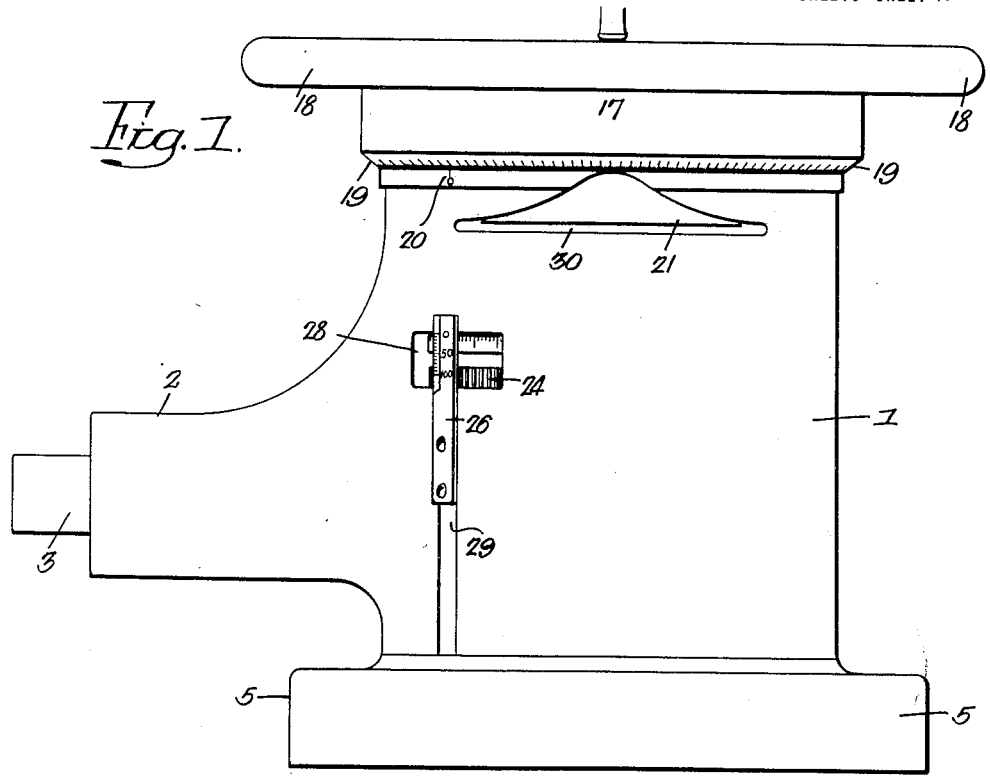
Figure 4:
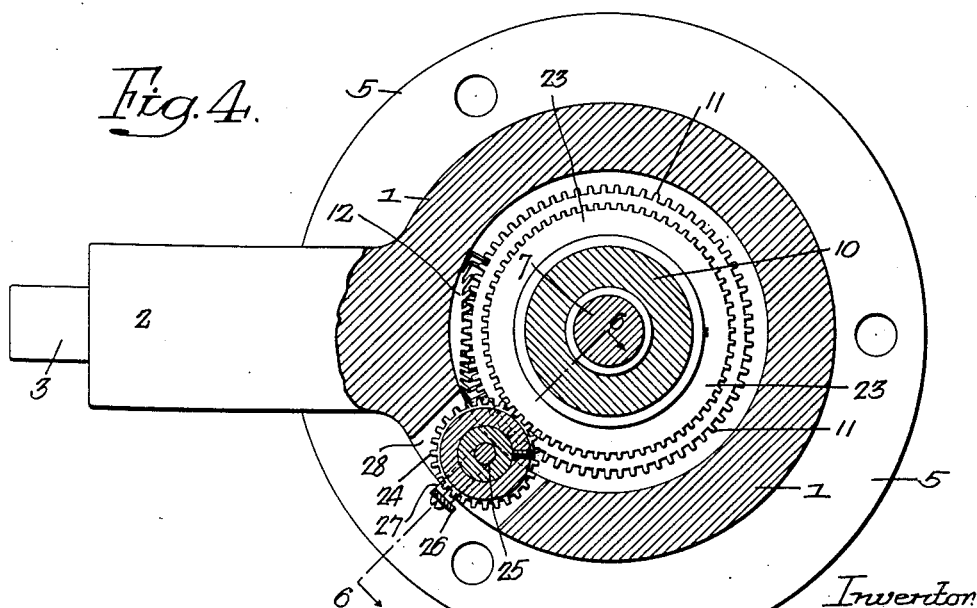
Figure 3:
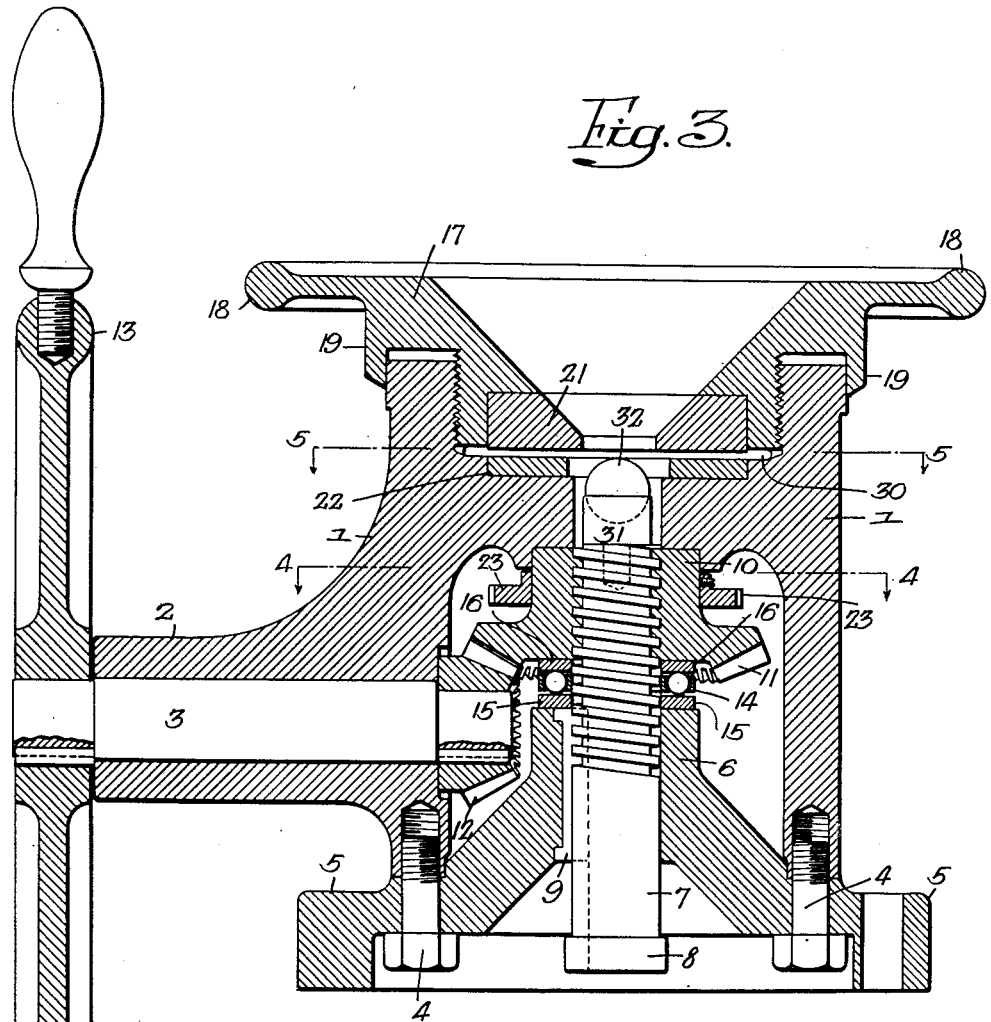
Figure 7:
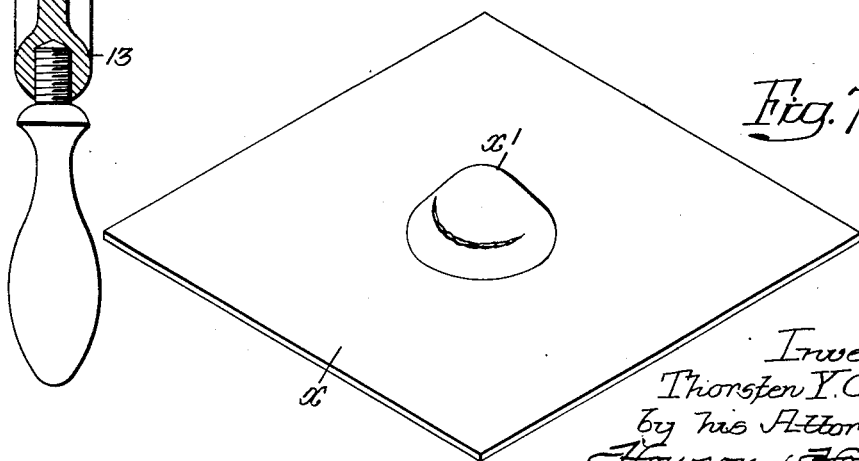
Fig. 7 is a perspective view of a sheet after it has been subjected to test in my improved machine.

Fig. 9 is a fragmentary vertical section of the machine shown in Fig. 8, taken in a plane at right angles to that of the latter figure; and Figs. 10 and 11 are respectively a front elevation and a central vertical section of another modified form of my invention equipped with means for measuring the height of the projected portion of a test piece and also with a device for indicating the force or pressure applied to said test piece.

In Figs. 1 to 9 of the above drawings 1 represents a generally cylindrical body structure consisting of a casting having a side extension 2 in which is journaled a horizontally extending shaft 3. Said body is connected by bolts 4 to a circular base structure 5 having a central, upwardly projecting portion 6 provided with a vertical passageway in which a spindle 7 is slidable.

The lower end of the spindle 7 has a head 8 to limit its upward movement and is prevented from turning in the bearing or guideway 6 by suitable means such as a key 9, which extends into a vertical keyway formed in the structure 6. The upper portion of the spindle 7 is threaded and has mounted on it a nut 10 connected to or forming part of a beveled gear wheel 11 which meshes with a beveled pinion 12 fixed to the inner end of the horizontal shaft 3. This latter shaft has fastened to it a hand wheel 13. Suitable antifriction bearings 14 are mounted between a pair of annular bearing plates 15 and 16 respectively engaged with the adjacent faces of the part 6 of the base 5 and of the beveled gear 11.

The body 1 has a vertical passage in line with the vertical spindle 7 and its upper face is formed with a cylindrical depression whose interior wall is threaded for the reception of a correspondingly formed thread on the external surface of a plate-holding member 17 in the form of an annular structure having a flange projecting outwardly from its upper edge to constitute a hand wheel 18. This annular member is also provided with a downwardly extending beveled edge 19 closely fitting around the upper end of the body structure 1, which as shown in Fig. 1, has an index or zero mark 20 placed to coact with a micrometer scale on said edge 19.

A suitable die 21 of relatively hard metal is set in the under face of the clamping member 17 which has a central downwardly tapering cavity extending into and through said die. The bottom of the recess into which the holding member 17 is screwed likewise has set in it a hardened plate or die 22 likewise having an opening concentric with the center line of the spindle 7 as well as with the opening in the die 21.

For measuring the movement of the spindle, I provide a small gear 23 fixed to the nut 10 and meshing with a second gear 24 threaded on a vertically slidable spindle 25 whose upper and lower ends respectively enter openings in the body 1 and base structure 5. As shown in Fig. 1, a portion of the periphery of the gear 24 is graduated or provided with a scale designed to coöperate with an indicating bar 26 which, through a block 27, is rigidly fastened to the vertically movable spindle 25. This bar 26 is graduated downwardly from a zero line which may be brought to the same level as the straight edge of the top of the opening in the body or frame structure 1 in which the gear 24 is mounted, and the block 27 is guided in a vertical slot 29 extending downwardly from said opening.

The body structure 1 has adjacent its upper end a transverse opening or passage through which a plate to be tested may be introduced to the space between the die plates 21 and 22. The threaded spindle 7 at its upper end carries a removable head 31, recessed in its upper face for the reception of a hardened metal ball or other plate engaging member 32 of less diameter than the opening in the die 21 and it is noted that the latter projects below the lower face of the holding member 17 so as to engage a plate inserted through the opening 30, and, when said member is screwed down upon it, clamp such plate against the die plate 22.

The various parts are so proportioned and adjusted that the zero mark of the vertically movable scale 26 is coincident with or at the level of the upper edge of the opening 28 when the ball 32 is just touching the under surface of a test plate clamped between the die plates 21 and 22, and before testing such a plate, the member 17 is unscrewed or backed off a predetermined small distance so that said plate is free to move laterally.

When therefore the shaft 3 is turned by means of the hand wheel 18, the gears 12 and 11 and consequently the nut 10 are likewise turned so that the vertical shaft 7 is forced upwardly toward the test plate,—the ball 32 being thus caused to force the adjacent portions of said plate upwardly through the opening in the die 21, drawing it out in a more or less conical or dome-like form until it breaks or cracks at some point on the side of such drawn out portion. The ductility as well as certain other qualities of the plate under test is indicated or made observable not only by the condition of the pressed out part $x'$ at the time of rupture, but also by its height, and this may be measured by noting the division of the scale 26 which lies opposite the upper edge of the opening 28 when breakage of the test piece occurs, since the rotation of the nut 10 likewise turns the gears 23 and 24, and the rotation of the latter causes a corresponding upward movement of the spindle 25 and scale 26. The thickness of the plate under test may be accurately measured by the use of the scale on the beveled edge 19 of the holding member 17 and the index mark on the body.

If desired I may construct the machine as shown in Fig. 9, with a beveled gear wheel 36 confined in a cavity in the lower part of the body $1^a$ by means of a base plate $5^a$. In this case the vertical spindle $7^a$ is threaded into a threaded opening in the body and passes loosely through the beveled gear 36, which however, is splined to it by a key $9^a$. In this form of the invention there is a passage $30^a$ through the top part of the body $1^a$ to permit of the introduction of a plate to be tested between the dies 21 and 22, of which the former is, as before, carried by an annular holding member $17^a$ threaded into a depression in the top of said body. The threaded spindle $7^a$ carries a round-ended head or punch $32^a$ and has anti-friction bearings 39 mounted between the latter and its upper end. In addition the body $1^a$ has a transverse passage 40 at a suitable point between the passage $30^a$ and the cavity in which is mounted the bevel gear 36, and in this passage the spindle $7^a$ has mounted on it a graduated disk 41, designed to coact with a vertically extending indicator 42 which is also graduated, to determine the depth of indentation of a test sheet by the spindle $7^a$.

As before the beveled gear on the spindle $7^a$ is driven by a beveled pinion 12 fixed to a horizontal shaft 3 whose upper end is designed for the reception of a hand wheel, and under conditions of use a plate to be tested is indented or pressed out by the rounded end of the spindle, until it ruptures.

While that form of my invention shown in Figs. 1 to 4 inclusive, involves the provision of a nut 10 constituting the hub of a beveled gear 11, I may under certain conditions, substitute for this structure a worm wheel 50 and drive it by a worm 51 fixed to the shaft $3^a$ in any suitable manner. Obviously said shaft, as shown in Figs. 10 and 11, extends in a line to one side of the center line of the spindle 7 and as before has fixed to it an operating wheel 13.

If desired, I may utilize a measuring device such as that shown in Figs. 10 and 11, either in place of or in conjunction with the measuring apparatus shown in Fig. 1, so mounting this that it shall be actuated directly by the displaced portion of the plate under test. For this purpose I loosely mount a ring 52 concentrically within the central and usually conical cavity or passageway in the member 17 and rigidly connect to or form integral with said ring a spider-like structure 53 on which is carried any suitable instrument for measuring and indicating movement, such for example as an Ames dial. This includes a dial 54 carried by the spider structure 53, together with certain mechanism whose detail construction constitutes no part of the present invention and a vertically extending bar 55 which projects downward in the center line of the spindle 7 so as to be capable of engaging the surface of the plate under test.

After such a plate has been mounted in the space 30, the instrument is so adjusted that when the bar 55 engages its upper surface, the indicator or pointer 56 stands at zero. The face of the dial 54 is so graduated that as said bar 55 is moved upwardly by the displacement of the part $x'$ of the plate under test, the pointer 56 coöperates with the graduations of the dial or scale to give direct readings of the distance from the apex of the displaced portion to the plane of the top surface of the plate.

In order to measure or indicate the force exerted upon the plate under test at any particular time, I may equip any form of my invention with the device shown in detail in Fig. 11, which consists of an annular and sufficiently flexible casing 57 containing water or other liquid and mounted within an annular recess of a ring 58 carried upon the top face of the bearing or guideway structure $6^a$, the top surface of said ring being engaged by an annular plate or washer 59 which in turn is acted on by one of the bearing plates 15 for the anti-friction bearing $14^a$. The annular casing or liquid-containing bag is made of suitable flexible metal and is connected through a conduit 61 with a pressure recording instrument 62, having an indicator 63 and provided with graduations, preferably arranged to read directly in units of pressure per unit of area.

With the above described arrangement of parts it will be understood that the operation of the shaft 51 and the consequent engagement of the plate under test by the upper end of the spindle 7, causes the latter, through the hub of the worm wheel 50, to exert compressive stress upon the liquid-containing casing 57 and thus so actuate the force-indicating pointer 63 as to give a reading of the force exerted by said spindle upon the plate.

I claim:—

1. The combination in a testing machine of a body threaded at one end; a perforated holding member adjustably threaded on said body; a threaded indenting spindle guided by the body and movable toward and from the opening in said holding member, there being a passage in the body for the admission of a test plate between the holding and indenting members; with means for actuating said indenting member.

2. The combination in a testing machine of a body having a cavity and a base member; a gear mounted in said cavity between a part of the body and said base member; a longitudinally movable spindle extending through said gear; a member for loosely holding a test plate to the body in position to be acted on by said indenting member; with means for actuating the gear to longitudinally move the spindle.

3. The combination in a testing machine of a body having a cavity and a base member; a gear mounted in said cavity between a part of the body and said base member; a longitudinally movable spindle extending through said gear; a member for loosely holding a test plate to the body in position to be acted on by said indenting spindle; and means for actuating the gear to longitudinally move the spindle, consisting of a shaft extending at right angles thereto; a gear on said shaft engaging said first gear; and means for forcibly turning the shaft.

4. The combination in a testing machine of a hollow body; a base structure detachably connected to said body; two coacting beveled gears mounted in the hollow of the body; a power actuated shaft connected to one of said gears; a threaded shaft actuated by the other gear; and a plate holding member having a threaded opening in the line of movement of said threaded shaft, there being an opening in the body placed to permit a plate to be introduced between the holding member and the end of the threaded shaft.

5. The combination in a testing machine of a hollow body; a longitudinally movable shaft non-rotatably held by said body; means including a nut for actuating said shaft; and a member for loosely holding a plate to the body, the latter having an opening placed to permit of the introduction of a plate between one end of said shaft and the holding member.

6. The combination in a testing machine of a body; a threaded shaft longitudinally movable therein; means for holding a plate in position to be indented by said shaft; means for preventing rotation of the shaft; a nut threaded on the shaft for causing longitudinal movement thereof; means for actuating the nut; a gear on the nut; a second gear meshing with said first gear and having a graduated portion; with an indicator placed to coöperate with the graduations of said second gear.

7. The combination in a testing machine of a body; a threaded shaft longitudinally movable therein; means for holding a plate in position to be indented by said shaft; means for preventing rotation of said shaft; a nut threaded on the shaft for causing longitudinal movement thereof; means for actuating the nut; a gear on the nut; a second gear meshing with said first gear and having a graduated portion; with an indicator placed to coöperate with the graduations of the second gear.

8. The combination in a testing machine of a body having in its top an internally threaded recess and provided with a transverse passage for the introduction of a plate to be tested; a perforated holding member threaded into said recess and having a graduated flange coöperating with an adjacent portion of the body; a longitudinally movable indenting member guided in the body; and means for moving said indenting member toward a plate retained by the holding member to force the latter through the opening in the latter.

9. The combination in a testing machine of a body having a threaded upper portion and provided with a transverse passage for the introduction of a plate to be tested; an annular holding member threaded to the threaded upper portion of said body; a longitudinally movable indenting member guided in the body; and means for moving said member toward a plate retained by the holding member to force said plate through the opening in the latter.

10. The combination in a testing machine of means for holding a plate to be tested; a threaded spindle mounted so as to be movable toward and from the plate under test; a threaded structure engaging the threaded spindle; and a device for measuring the thrust of the spindle upon said threaded structure, for indicating the force exerted by the spindle upon the plate under test.

11. The combination in a testing machine of means for holding a plate to be tested; an indenting member movable toward and from the plate; means for actuating said member to cause it to indent one side of the plate and laterally displace a portion of the same on the opposite side thereof; with an instrument including a member engaging the displaced portion of the plate, for measuring the amount of projection thereof.

12. The combination in a testing machine of a frame; means for holding a plate to said frame including a plate engaging member having a passage therein; a spindle movable toward and from the passage of said member; means for actuating the spindle to cause it to laterally displace a portion of the plate into said passage of the holding member; with an instrument mounted on the holding member and including a bar extending in the passage thereof, for measuring the displacement of the portion of the plate under test.

13. The combination in a testing machine of a frame; an annular plate holding member threaded thereto; an instrument rotatably mounted on said threaded member and including a plate-engaging bar extending in the opening of said member; a spindle movable toward and from the opening of the holding member; and means for actuating said spindle to displace a portion of the plate under test into the opening of the holding member so as to actuate the bar of the measuring instrument.

In witness whereof I affix my signature.

THORSTEN Y. OLSEN.